US012792604B2

(12) United States Patent
Gupta et al.

(10) Patent No.: US 12,792,604 B2
(45) Date of Patent: Nov. 10, 2026

(54) ENHANCING DATABASE QUERY GENERATION IN LARGE LANGUAGE MODELS USING EVOLUTIONARY COMPUTATION ALGORITHMS

(71) Applicant: Dell Products L.P., Round Rock, TX (US)

(72) Inventors: Srishti Gupta, Delhi (IN); Satyam Kumar, Bengaluru (IN); Saurabh Jha, Leander, TX (US)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 19/073,925

(22) Filed: Mar. 7, 2025

(65) Prior Publication Data

US 2026/0267856 A1 Sep. 10, 2026

(51) Int. Cl.
*G06F 16/2453* (2019.01)
*G06F 16/242* (2019.01)

(52) U.S. Cl.
CPC .... *G06F 16/24542* (2019.01); *G06F 16/2438* (2019.01)

(58) Field of Classification Search
CPC ........................ G06F 16/24542; G06F 16/2438
See application file for complete search history.

(56) References Cited

U.S. PATENT DOCUMENTS 11,347,734 B1 * 5/2022 de Nijs ............. G06F 16/24542
12,007,993 B1 * 6/2024 Angius ............... G06F 16/2329
12,493,803 B1 * 12/2025 Pathak ................ G06F 16/3329
2021/0365452 A1 * 11/2021 Lydick .................. G06F 16/242
2022/0292097 A1 * 9/2022 Borthakur ......... G06F 16/24542
2024/0265018 A1 * 8/2024 Szymanski ......... G06F 16/2237
2025/0173330 A1 * 5/2025 Durg ..................... G06F 16/243
2025/0252122 A1 * 8/2025 Bhura ................. G06F 16/3347
2025/0278419 A1 * 9/2025 Mui ....................... G06F 40/295
2025/0384332 A1 * 12/2025 Boué ................. G06F 16/90335
2026/0017112 A1 * 1/2026 Baker ..................... G06F 9/505
2026/0017325 A1 * 1/2026 Kuppusamy ........ G06F 16/9038

* cited by examiner

*Primary Examiner* — Huawen A Peng
(74) *Attorney, Agent, or Firm* — Chamberlain, Hrdlicka, White, Williams & Aughtry; Aly Z. Dossa

(57) ABSTRACT

A method for servicing user queries includes obtaining, by a data system and from a client device, a user query for accessing a database, in response to the user query: configuring an enhanced context embedding model, applying a vectorized embedding on the user query using the enhanced context embedding model to obtain a vectorized user query, performing a hyperparameter optimization on the vectorized user query using a pre-defined optimization algorithm to obtain an optimal database query, issuing the optimal database query to the database to obtain a response, and providing the response to the client device.

14 Claims, 6 Drawing Sheets

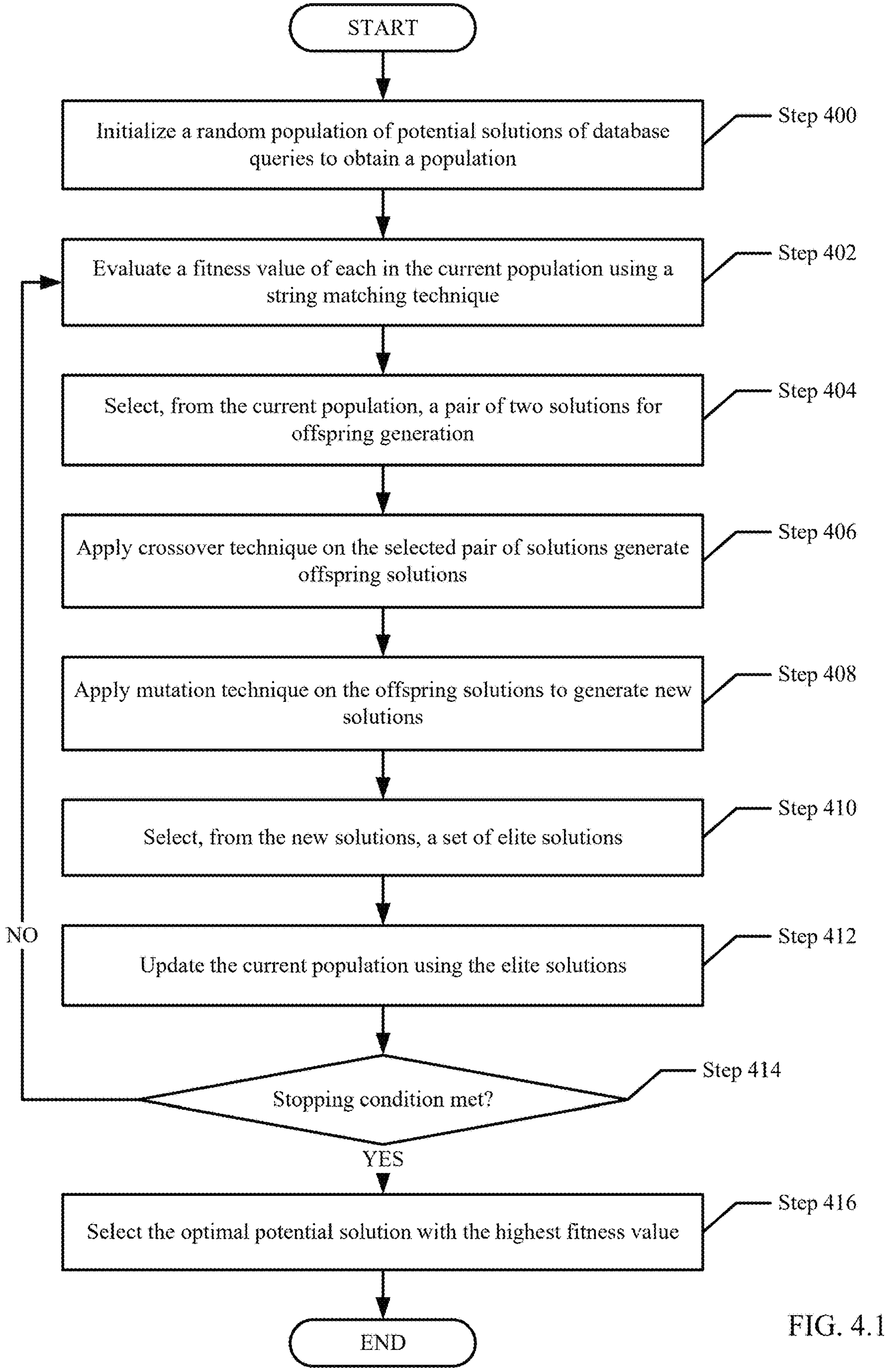
FIG. 4.1

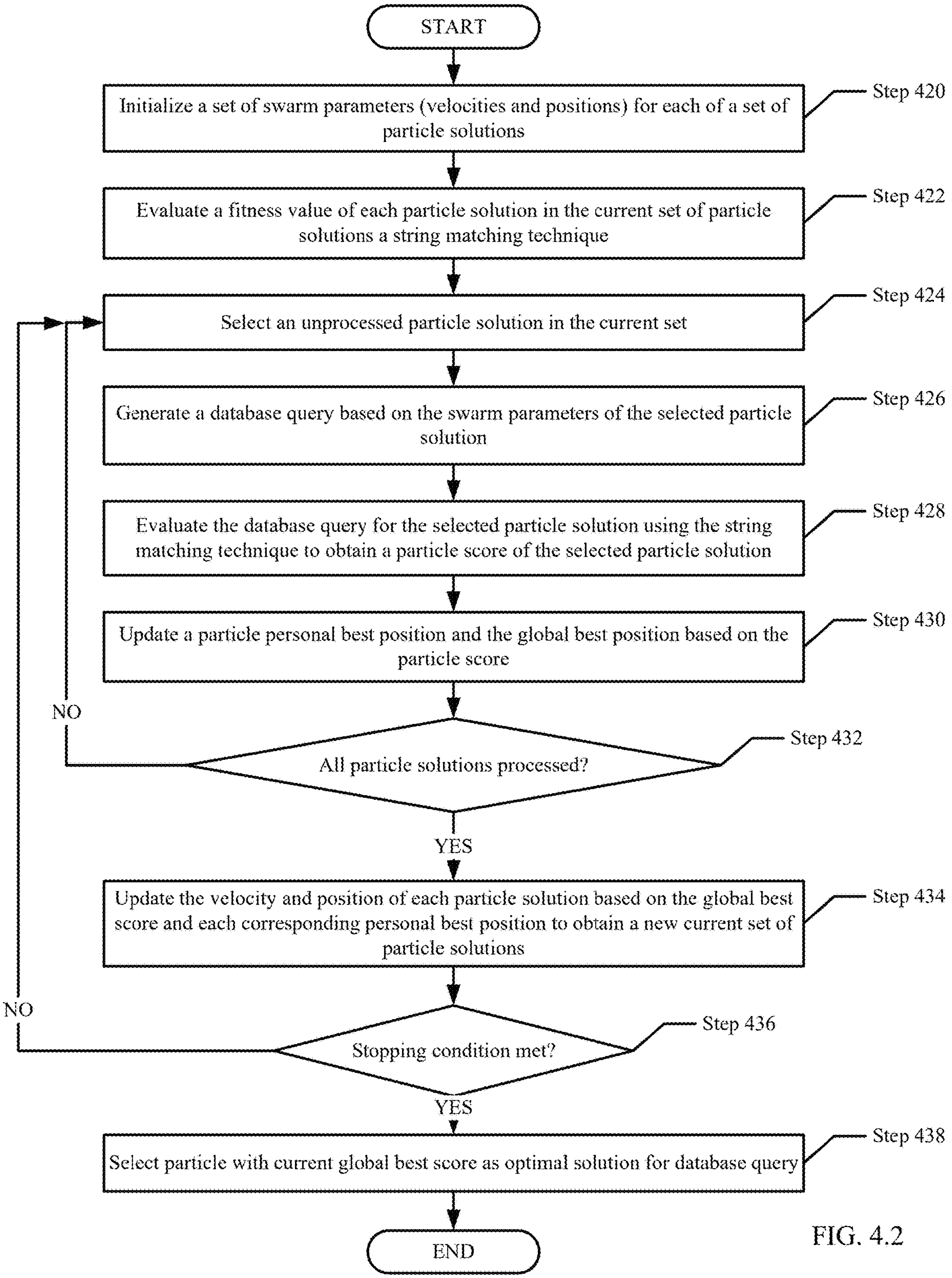
FIG. 4.2

ENHANCING DATABASE QUERY GENERATION IN LARGE LANGUAGE MODELS USING EVOLUTIONARY COMPUTATION ALGORITHMS

BACKGROUND

Large language models (LLM) may be frequently used for accessing data in a database. The database may require using a particular format in its queries to provide the data. LLMs may be limited in their ability to generate accurate and useful queries in the particular formats.

BRIEF DESCRIPTION OF DRAWINGS

Certain embodiments of the invention will be described with reference to the accompanying drawings. However, the accompanying drawings illustrate only certain aspects or implementations of the invention by way of example and are not meant to limit the scope of the claims.

FIG. 4.1 shows a flowchart of a method for performing a genetic algorithm to generate a database query in accordance with one or more embodiments of the invention.

FIG. 4.2 shows a flowchart of a method for performing a particle swarm optimization algorithm to generate a database query in accordance with one or more embodiments of the invention.

DETAILED DESCRIPTION

Figure 1:
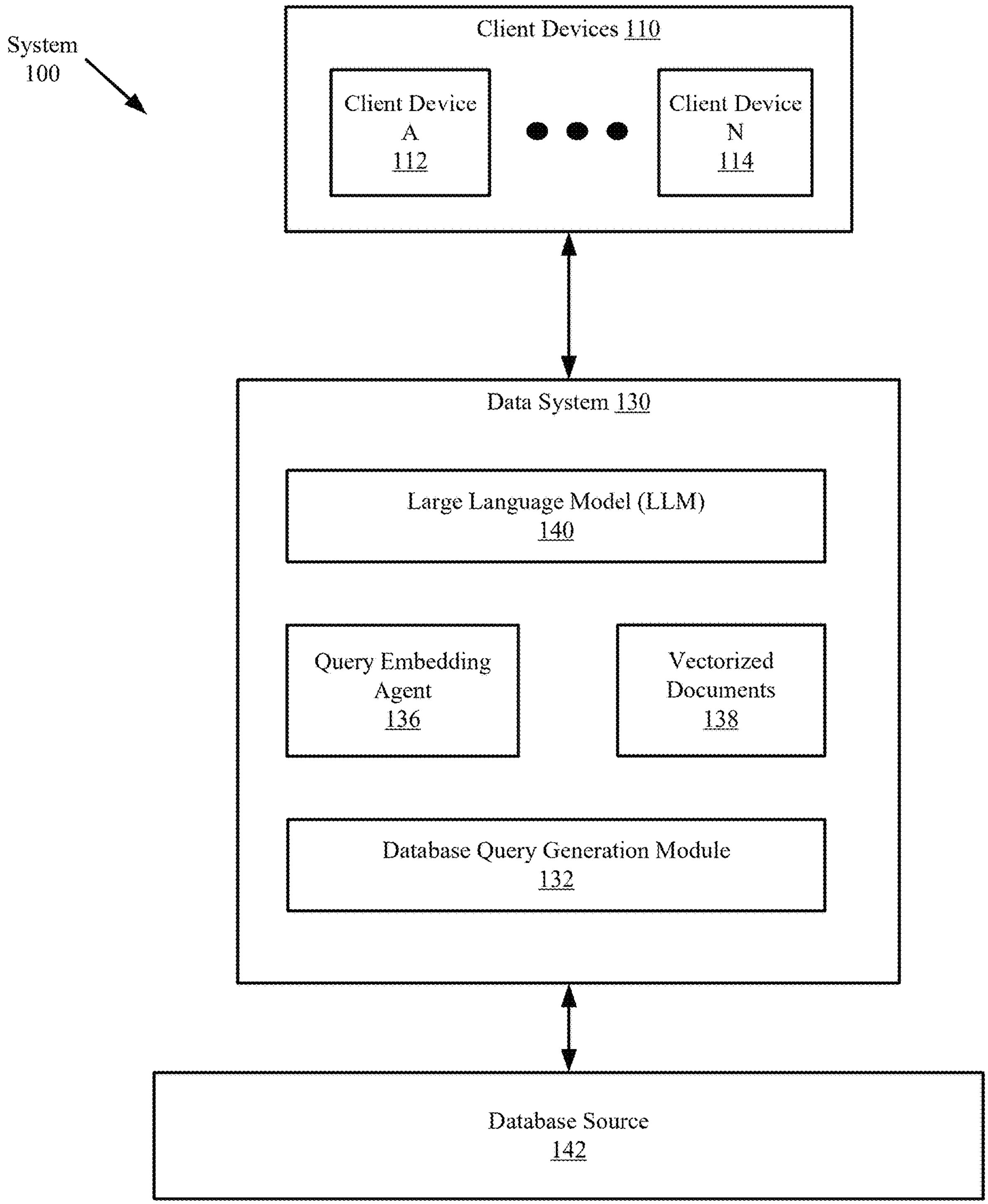
FIG. 1 shows a diagram of a system in accordance with one or more embodiments of the invention.

Specific embodiments will now be described with reference to the accompanying figures. In the following description, numerous details are set forth as examples of the invention. It will be understood by those skilled in the art that one or more embodiments of the present invention may be practiced without these specific details, and that numerous variations or modifications may be possible without departing from the scope of the invention. Certain details known to those of ordinary skill in the art are omitted to avoid obscuring the description.

In the following description of the figures, any component described with regard to a figure, in various embodiments of the invention, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments of the invention, any description of the components of a figure is to be interpreted as an optional embodiment, which may be implemented in addition to, in conjunction with, or in place of the embodiments described with regard to a corresponding like-named component in any other figure.

Throughout this disclosure, elements of figures may be labeled as A to N, A to P, A to M, or A to L. As used herein, the aforementioned labeling means that the element may include any number of items, and does not require that the element include the same number of elements as any other item labeled as A to N, A to P, A to M, or A to L. For example, a data structure may include a first element labeled as A and a second element labeled as N. This labeling convention means that the data structure may include any number of the elements. A second data structure, also labeled as A to N, may also include any number of elements. The number of elements of the first data structure and the number of elements of the second data structure may be the same or different.

As used herein, the phrase operatively connected, operably connected, or operative connection, means that there exists between elements, components, and/or devices a direct or indirect connection that allows the elements to interact with one another in some way. For example, the phrase 'operably connected' may refer to any direct (e.g., wired directly between two devices or components) or indirect (e.g., wired and/or wireless connections between any number of devices or components connecting the operably connected devices) connection. Thus, any path through which information may travel may be considered an operable connection.

Embodiments of the invention include systems and methods for utilizing large language models (LLMs) to generate database queries for accessing data in one or more database sources. Specifically, embodiments of the invention may process user queries obtained in a format (e.g., a natural language) not readable to the database and use the LLM and a hyperparameter optimization to obtain, for each of the user queries, an optimal solutions for a database query that accurately requests the data specified in the user query. In one or more embodiments, the hyperparameter optimization includes applying a genetic algorithm (GA) on parameters of a user query to obtain the optimal database query. Alternatively, the hyperparameter optimization includes applying a particle swarm optimization (PSO) algorithm to obtain the optimal database query. The database may be, for example, a Structured Query Language (SQL) database. As such, the database queries may be SQL queries.

Embodiments of the invention may address the increasing demand for precise and contextually appropriate natural language interfaces to access complex database systems, which may be essential in many modern data-driven enterprises. The proportion of end users in industry who know SQL is relatively small, thus pinpointing an area for machine learning (ML) to aid in making business decisions. A well-designed natural language processing (NLP) to SQL (NLP2SQL) algorithm may be able to understand a natural language (NL) query and translate it into a database query. Developing a NLP2SQL may impose the following challenges; 1. Cross domain or out of domain words: Grammar based retrieval systems are domain dependent; generalized solutions are required that can generate domain-independent SQL queries, 2. Natural language uncertainty and interpretability: Most of the solutions deal with issues in finding the correct intent. To interpret natural language questions which can be written in many ways and still mean the same is still an open problem in NLP, 3. Handling nested queries: Generating single level query is relatively easy, while handling nested queries remain a challenge. It is important to address them since they are powerful enough to lead to optimized queries.

Embodiments of the invention provide a framework that integrates embedding-based retrieval, prompt tuning, and evolutionary algorithms to fine-tune the large language models. What sets this approach apart is its ability to improve model accuracy without extensive retraining, offering a more flexible and resource-efficient solution for use cases that aim to utilize artificial intelligence (AI) in specialized areas. The invention employs two key evolutionary optimization techniques for processing a natural language query: genetic algorithm (GA) and particle swarm optimization (PSO). These are leveraged to optimize critical hyperparameters of the language model, such as the number of sequences returned, token count limits, beam search size, temperature, and top-p sampling.

In one or more embodiments, the GA method follows a population-based optimization approach that includes natural selection elements like elitism, crossover, and mutation, preserving the best solutions while exploring new configurations. In one or more embodiments, the PSO method simulates a swarm's behavior by adjusting the position of a particle (or solution for a database query) based on both individual and collective performance. A notable feature is the fitness function, which evaluates the quality of database queries by comparing them to reference queries using string matching. The fitness function further includes a length penalty to prevent the generation of overly long or short queries, ensuring that outputs remain accurate, practical, and efficient. The invention describes the practical implementation of these techniques, utilizing NLP libraries for embedding and retrieval functions. The system processes database schema information, generates prompts, and applies optimization algorithms to fine-tune model hyperparameters.

Though embodiments of the invention focus on SQL query generation, techniques described herein may be adapted to optimize LLMs for a range of natural language processing tasks in alternate fields. This adaptability makes it a powerful tool for entities looking to customize AI models without significant retraining efforts.

Various embodiments of the invention are described below.

FIG. 1 shows a system in accordance with one or more embodiments of the invention. The system (100) includes any number of client devices (110), a data system (130), and any number of data sources (142). The overall system (100) may include additional, fewer, and/or different components without departing from the scope of the invention. Each component may be operably connected to any of the other component via any combination of wired and/or wireless connections. Each component illustrated in FIG. 1 is discussed below.

In one or more embodiments, each client device (112, 114) is implemented as one or more computing devices (e.g., 400, FIG. 4). A computing device may be, for example, a mobile phone, a tablet computer, a laptop computer, a desktop computer, a server, a sale terminal, a distributed computing system, or a cloud resource such as a transaction management unit. The computing device may include one or more processors, memory (e.g., RAM), and persistent storage (e.g., disk drives, SSDs, etc.). The computing device may include instructions, stored on the persistent storage, that when executed by the processor(s) of the computing device cause the computing device to perform the functionality of the client device (112, 114) described throughout this present disclosure.

In one or more embodiments of the invention, each client device (112, 114) is implemented as a logical device. A logical device may utilize the computing resources of any number of computing devices (refer to FIG. 5) to provide the functionality of the client environment (112, 114) described throughout this present disclosure.

In one or more embodiments, each client device (112, 114) may be used by any number of users managing data online using the data system (130). The users may access the data via computing devices of the respective client device (112, 114).

In one or more embodiments, a client device of any client environment (112, 114) may issue user queries to the data system (130). A user query may refer to a question, initiated by a user of the client environments (110), that requests information from a data source (142) such as, for example, a database. The data system (130) may perform the methods of FIGS. 3 and 4.1-4.2 to service such user queries.

In one or more embodiments, the data system (130) provides the functionality for: (i) obtaining user queries for data in the data sources (142) in a natural language, (ii) processing the user query using an enhanced context embedded model (134), and (iii) providing a response in the natural language. To perform the aforementioned functionality, the data system (130) includes large language model (LLM) (140), a query embedding agent (136), one or more vectorized documents (138), and a database query generation module (132). The data system (130) may include additional, fewer, and/or different components without departing from the invention.

Figure 3:
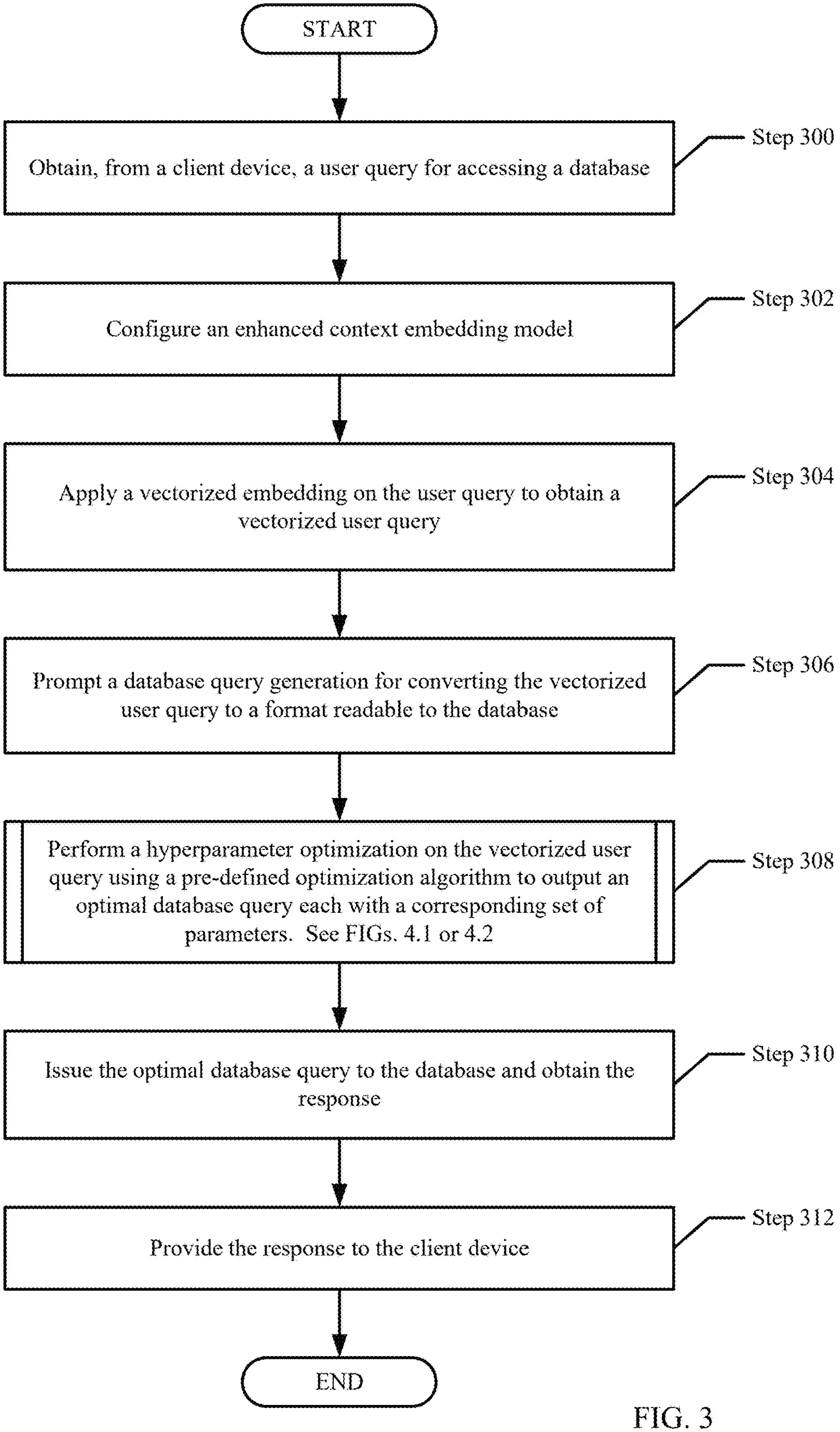
FIG. 3 shows a flowchart of a method for servicing user queries in accordance with one or more embodiments of the invention.

In one or more embodiments, the database query generation module (132) includes functionality for obtaining user queries from the client devices (110) and servicing the user queries in accordance with the method of FIG. 3.

In one or more embodiments, the vectorized documents (138) are a collection of chunked and processed portions of source documents obtained from the data sources (142). Each vectorized document may be associated with a portion (e.g., a paragraph) of a source document and embedded with additional metadata such as concepts, intent, emotion, and/or other additional information that is used during semantic search. The vectorized documents (138) may further be collectively referred to as a vectorized database.

In one or more embodiments, the LLM (140) is a machine learning model that obtains inputs that include: (i) user queries written in a natural language and (ii) one or more of the vectorized documents (138) collected as an enhanced context of a corresponding user query. The LLM (140) may output a response to the user query, using the content of the inputted one or more vectorized documents (138). The output may be in a natural language. The LLM (140) may be implemented using any machine learning algorithm (e.g., convolutional neural network (CNN), generative AI, etc.) without departing from the invention.

In one or more embodiments, the data system (130) (and/or each component illustrated within) is implemented as a computing device (e.g., 400, FIG. 4). A computing device may be, for example, a mobile phone, a tablet computer, a laptop computer, a desktop computer, a server, a sale terminal, a distributed computing system, or a cloud resource such as a transaction management unit. The computing device may include one or more processors, memory (e.g., RAM), and persistent storage (e.g., disk drives, SSDs, etc.). The computing device may include instructions, stored on the persistent storage, that when executed by the processor(s) of the computing device cause the computing device to perform the functionality of the data system (130) (and/or each component illustrated within) described throughout this present disclosure including the methods of FIGS. 2, 3, and 4.1-4.2.

Alternatively, in one or more embodiments of the invention, the data system (130) (and/or each component illustrated within) is implemented as a logical device. A logical device may utilize the computing resources of any number of computing devices to provide the functionality of the data system (130) (and/or each component illustrated within) described throughout this present disclosure including the methods of FIGS. 2, 3, and 4.1-4.2.

To clarify aspects of the invention, consider a scenario in which a client device (e.g., 112) issues a user query for obtaining information from one of the data sources (142) being a SQL database. The user query may include the following text: "Give me the 5 collectors with the highest PD (past due)". In this scenario, the data system (130) may perform the method of FIG. 3 to process the user query. This may include generating a SQL query (e.g., a database query in the SQL format) to access the SQL database. The method of FIG. 3 may include performing a hyperparameter optimization on a modified user query (see step 308 of FIG. 3). Such hyperparameter optimization may include one of the methods of FIGS. 4.1-4.2. The output of step 308 may be a generated SQL query. The generated SQL query may be a query written in the SQL format that specifies obtaining the five collectors in the SQL database with the highest past due in the performance data. The generated SQL query may be issued to the SQL database to obtain a response. The response may be provided to the client device (112) by the data system (130).

Figure 2:
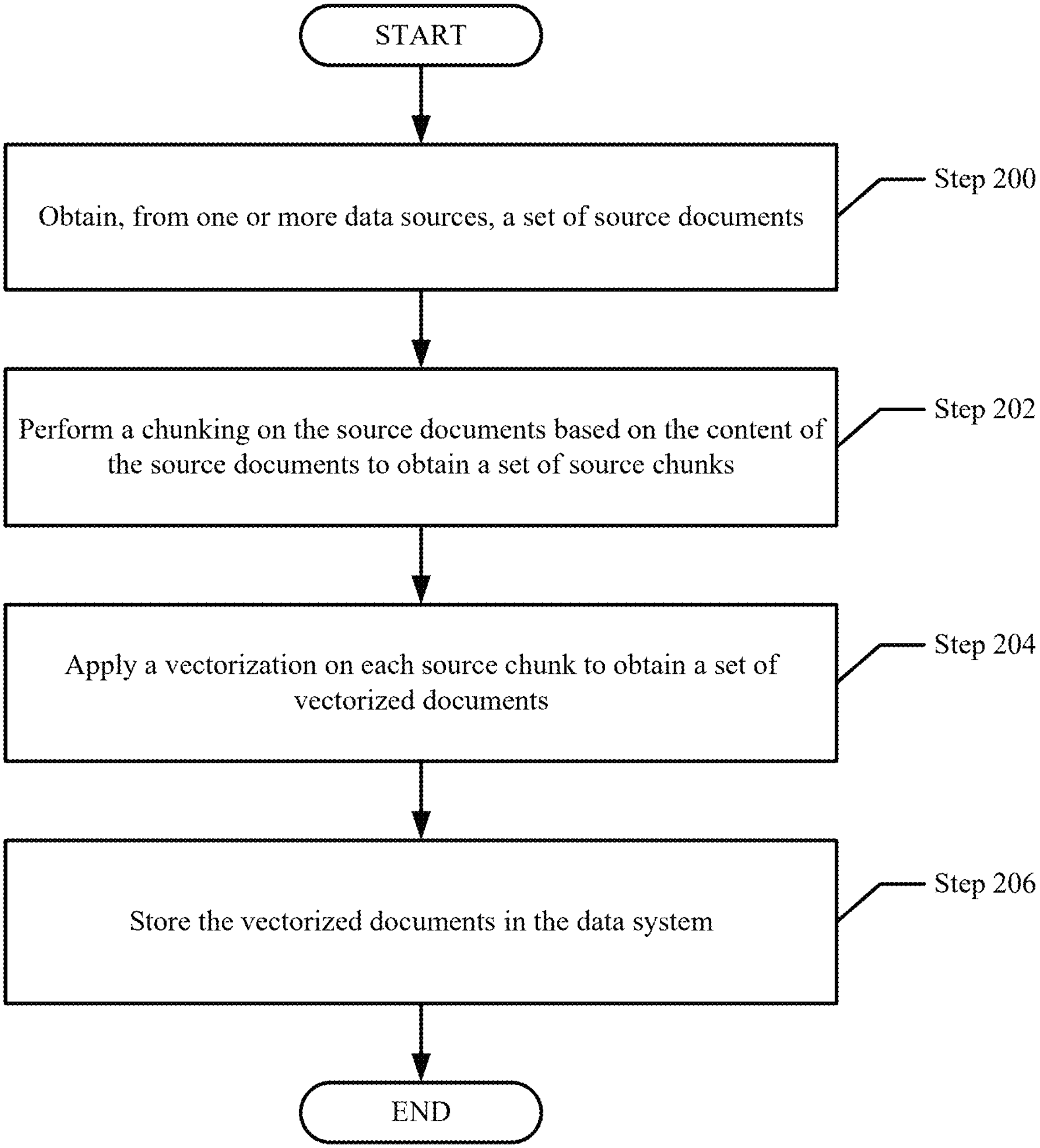
FIG. 2 shows a flowchart of a method for generating vectorized documents in accordance with one or more embodiments of the invention.

FIG. 2 shows a flowchart of a method for generating a set of vectorized documents in accordance with one or more embodiments of the invention. The method shown in FIG. 2 may be performed by, for example, a data system (130, FIG. 1). Other components of the system illustrated in FIG. 1 may perform the method of FIG. 2 without departing from the invention. While the various steps in the flowchart are presented and described sequentially, one of ordinary skill in the relevant art will appreciate that some or all of the steps may be executed in different orders, may be combined or omitted, and some or all steps may be executed in parallel.

In step 200, a set of source documents are obtained from one or more data sources (142, FIG. 1). In one or more embodiments, the source documents may be associated with a database. The one or more source documents may be selected, for example, by an administrator of the data system.

In step 202, a chunking is performed on the source documents based on the content of the source documents to obtain a set of source chunks. In one or more embodiments, the chunking includes identifying separation points of each source documents to partition each source document into the source chunks. The separation points may be identified using, for example, paragraph separations of the source documents.

In step 204, a vectorization is applied on each source chunk to obtain a set of vectorized documents. In one or more embodiments, the vectorization includes embedding each source chunk with metadata, or other information, that may be used for semantic search while servicing a user query in accordance with FIG. 3.

In step 206, the vectorized documents are stored in the data system.

FIG. 3 shows a flowchart of a method for servicing a user query in accordance with one or more embodiments of the invention. The method shown in FIG. 3 may be performed by, for example, a data system (130, FIG. 1). Other components of the system illustrated in FIG. 1 may perform the method of FIG. 3 without departing from the invention. While the various steps in the flowchart are presented and described sequentially, one of ordinary skill in the relevant art will appreciate that some or all of the steps may be executed in different orders, may be combined or omitted, and some or all steps may be executed in parallel.

Turning to FIG. 3, in step 300, a user query is obtained from a client device. The user query may include a request to obtain information from a database and is associated with one or more source documents converted to vectorized documents (138, FIG. 1). The user query may be in a natural language In step 302, an enhanced context embedding model is configured. In one or more embodiments, the enhanced context embedding model is a data structure that utilizes the vectorized documents generated in FIG. 2 to output a portion of the set of vectorized documents for the purpose of identifying vectors to be embedded on the user query. For example, the enhanced context embedding model may process parameters of the user query such as, for example, intent, semantics, vocabulary, and/or other parameters without departing from the invention. For example, a semantic search is performed on the user query to identify a subset of the vectorized documents associated with the user query. In one or more embodiments, the semantic search includes vectorizing the user query by embedding high dimensional mathematical representations of the text and any implied meanings of the text in the user query. A k-nearest neighbors (kNN) algorithm may be applied to the vectorized user query and a vectorized database to identify the subset of the vectorized documents that are each most related to the vectorized representation of the text based on their respective vectorized embeddings. In this manner, a k-shot prompting is applied such that each vectorized document in the identified subset is deemed to meet a threshold of relevance to the vectorized user query based on the semantic search. For example, the subset of vectorized documents may be ranked using a cosine similarity based on the k-shot prompting.

In step 304, a vectorized embedding is applied on the user query to obtain a vectorized user query. In one or more embodiments, the vectorized embedding includes generating the vectors using the subset of vectorized documents to generate the vectorized user query.

In step 306, a database query generation is prompted for converting the vectorized user query to a format readable to the database. In one or more embodiments, the database query generation module (132) is initiated to perform a hyperparameter optimization algorithm. The database query generation module may be prompted by inputting the vectorized user query and a selected optimization algorithm (either a genetic algorithm (GA) or a particle swarm optimization (PSO)). Alternatively, the database query generation module only obtains the vectorized user query and selects the hyperparameter optimization to be used to generate the database query.

In step 308, a hyperparmeter optimization is performed on the vectorized user query using a pre-defined optimization algorithm to output an optimal database query. In one or more embodiments, the pre-defined optimization algorithm may be one of: a GA or PSO algorithm. The selection between the GA or PSO algorithms may be based on the input to the database query generation module and/or based on a selection by the database query generation module.

In one or more embodiments, the GA includes using a population-based approach to evolve optimal hyperparameter configurations (also referred to as solutions). The algorithm initialized a population of individual solutions, with each solution representing a unique set of hyperparameters including, for example, max_new_tokens, num_beams, temperature, and top_p. These parameters may be chosen from predefined ranges to ensure a diverse initial population. A fitness function is used for evaluating the solutions by generating a database query using the large language model with the individual's hyperparameter and calculating a string matching between the generated query and a reference database query, with lower distances indicating better fitness. Selection for crossover and mutations use a fitness-proportionate approach, adjusting raw fitness scores to ensure individuals with better performance to have higher selection probabilities. Crossover includes combining hyperparameters from two parent individuals, randomly selecting each parameter from either parent. Mutation includes applying a small probability (e.g., 0.2) to each hyperparameter to determine whether to randomly select a new value from the predefined ranges. The GA may further include incorporating elitism by preserving, for example, a top five individuals in each generation for the updated population. Iterations of selections for crossover and mutations may be performed until a best fitness (based on string matching) reaches a pre-defined threshold, indicating a close match to the reference query. For additional details regarding the GA method, refer to FIG. 4.1.

In one or more embodiments, the PSO implementation is modeled as a swarm intelligence problem. It initializes a swarm of particles, each representing a potential solution in the hyperparameter space. The algorithm defines lower and upper bounds for each hyperparameter. The PSO's objective function includes generating SQL queries using the large language model with each particle's hyperparameters. It then calculated the String matching between the generated and reference queries, incorporating a length penalty to avoid overly long or short queries. The algorithm includes updating the particle velocities and positions over iterations. Velocity updates consider a previous velocity (inertia weight w=0.5) of each particle, its personal best position (cognitive component c1=1.5), and the swarm's global best position (social component c2=1.5). Position updates moved particles based on their velocities, constraining them within the defined hyperparameter bounds. For additional details regarding the PSO algorithm, refer to FIG. 4.2.

In step 310, following the generation of an optimal database query generated in accordance with one of the pre-defined optimization algorithms discussed in FIGS. 4.1-4.2, the optimal database query is issued to the database to obtain a response. The response may include information initially requested in the user query obtained in step 300.

In step 312, the response is provided to the client device.

FIG. 4.1 shows a flowchart of a method for performing a genetic algorithm to generate a database query in accordance with one or more embodiments of the invention. The method shown in FIG. 4.1 may be performed by, for example, a data system (130, FIG. 1). Other components of the system illustrated in FIG. 1 may perform the method of FIG. 4.1 without departing from the invention. While the various steps in the flowchart are presented and described sequentially, one of ordinary skill in the relevant art will appreciate that some or all of the steps may be executed in different orders, may be combined or omitted, and some or all steps may be executed in parallel.

In step 400, a random population of potential solutions of hyperparameters each associated with a potential database query is initialized. In one or more embodiments, the random population is initialized by generating a random set of solutions that each correspond to a set of hyperparameters that represent a potential database query. The generation of the solutions may be based on pre-defined ranges of each hyperparameter. Each combination of hyperparameters is deemed a potential solution.

In step 402, a fitness value is evaluated of each solution in the current population using a string matching technique. In one or more embodiments, the fitness value of a potential solution is generated based on the string matching technique to determine a distance of text between a reference database query and the potential solution. The distance, calculated using the string matching technique, may represent the fitness value. Such fitness value is calculated for each solution currently in the population. In one or more embodiments, a lower fitness value represents a more favorable solution.

In step 404, at least one pair of two solutions are selected for offspring generation. In one or more embodiments, the pair(s) are selected based on their fitness values. For example, the solutions may be selected based on a probability assigned to each solution/In this example, such solutions with a low fitness values may have be assigned a higher probability of being selected.

In step 406, a crossover technique is applied to each selected pair of solutions to generate offspring solutions. In one or more embodiments, the crossover technique includes swapping, between a pair of solutions, a portion of the hyperparameters to generate offspring solutions that share hyperparameters from each of the pair of hyperparameters. The crossover technique may share a resemblance to biological offspring generation, in which the offspring share deoxyribonucleic acid (DNA) from each of the two parents. The selections of hyperparameters to swap may be, for example, based on random selection.

In step 408, a mutation technique is applied on the offspring solutions to generate new solutions. In one or more embodiments, the mutation technique includes modifying (e.g., increasing or decreasing values of) the hyperparameters of the offspring solutions based on a relatively low probability (e.g., less than 0.2) that each hyperparameter is modified. The resulting solutions that include offspring solutions modified by the mutation technique and such offspring solutions that are not modified by the mutation technique are deemed the new solutions.

In step 410, a set of elite solutions are selected from the new solutions. In one or more embodiments, the elite solutions are selected by calculating the fitness values of each of the new solutions and determining, from the new solutions, a subset that has more favorable fitness values.

In step 412, the current population is updated using the elite solutions. In one or more embodiments, the current population is updated by including the elite solutions generated in 410 from the new solutions to the current population to have a new current population.

In step 414, a determination is made about whether a stopping condition is met. In one or more embodiments, the stopping condition is based on whether a pre-defined number of iterations of current populations (e.g., updated in accordance with steps 402-412) have been executed. Alternatively, the stopping condition may be based on whether at least one (or another predefined number) of the solutions in the current population meet a pre-defined threshold for their corresponding fitness value. If the stopping condition is met, the method proceeds to step 416; otherwise, the method returns to step 402.

In step 416, the optimal potential solution is selected with the most favorable fitness value. In one or more embodiments, the solution of the current population with the most favorable fitness value is selected as the solution for the database query.

FIG. 4.2 shows a flowchart of a method for performing a particle swarm optimization algorithm to generate a database query in accordance with one or more embodiments of the invention. The method shown in FIG. 4.2 may be performed by, for example, a data system (130, FIG. 1). Other components of the system illustrated in FIG. 1 may perform the method of FIG. 4.2 without departing from the invention. While the various steps in the flowchart are presented and described sequentially, one of ordinary skill in the relevant art will appreciate that some or all of the steps may be executed in different orders, may be combined or omitted, and some or all steps may be executed in parallel.

In step 420, a set of swarm parameters are initialized for each solution in a set of particle solutions. In one or more embodiments, the swarm parameters include a position and a velocity. The set of particle solutions may be generated randomly. The position of a particle solution may represent a set of hyperparameters used for a database query. The velocity may represent a change of values of one or more hyperparameters. The swarm parameters may be selected randomly for each particle solution.

In step 422, a fitness value of each particle solution in the current set of particle solutions is evaluated using a string matching technique. In one or more embodiments, the fitness value of a particle solution is generated based on the string matching technique to determine a distance of text between a reference database query and the hyperparameters in the particle solution. The distance, calculated using the string matching technique, may represent the fitness value. Such fitness value is calculated for each solution currently in the population. In one or more embodiments, a lower fitness value represents a more favorable solution.

In one or more embodiments, steps 424-432 include an iteration for identifying a personal best position of each particle solution and a global best position of the population. The personal best position of a particle solution represents a highest-rated position of the particle solution identified using the fitness value. The global best position of the population is the highest rated personal best position of all particle solutions.

In step 424, an unprocessed particle solution in the current set is selected. In one or more embodiments, the In step 426, a database query is generated based on the swarm parameters of the selected particle solution. The database query is generated based on the hyperparameters applied to the LLM and used for the evaluation.

In step 428, the database query is evaluated using the string matching technique to obtain a particle score. The particle score may be a fitness value of the particle solution.

In step 430, a particle personal best position and a global best position is updated based on the particle score. In one or more embodiments, the personal best position is updated with the current position based on whether the particle score of step 428 is more favorable than the particle score of the current personal best position of the particle solution. Further, the global best position is updated based on whether the particle score is more favorable than the particle score of the current global best position of the population.

In step 432, a determination is made about whether all particle solutions are processed. If all particle solutions are processed, the method proceeds to step 434; otherwise, the method proceeds to step 424.

In step 434, the velocity and position of each particle solution is updated based on the global best score and each corresponding personal position to obtain a new current set of particle solutions. In one or more embodiments, the position is updated by applying the changes of the current velocity to the current position to obtain a new updated position. The velocity may be updated based on the personal best position and the current global best position. For example, the velocity is updated such that the next changes to the hyperparameters may be made to approach the new current position towards the global best position and/or the personal best position.

In step 436, a determination is made about whether a stopping condition is met. In one or more embodiments, the stopping condition is based on whether a pre-defined number of iterations of current populations (e.g., updated in accordance with steps 424-434) have been executed. Alternatively, the stopping condition may be based on whether at least one (or another predefined number) of the particle solutions in the current population meet a pre-defined threshold for their corresponding fitness value. If the stopping condition is met, the method proceeds to step 438; otherwise, the method returns to step 424.

In step 438, a particle solution is selected based on the current global best score as the optimal solution for the database query. In one or more embodiments, the solution of the current population with the most favorable fitness value is selected as the solution for the database query.

Figure 5:
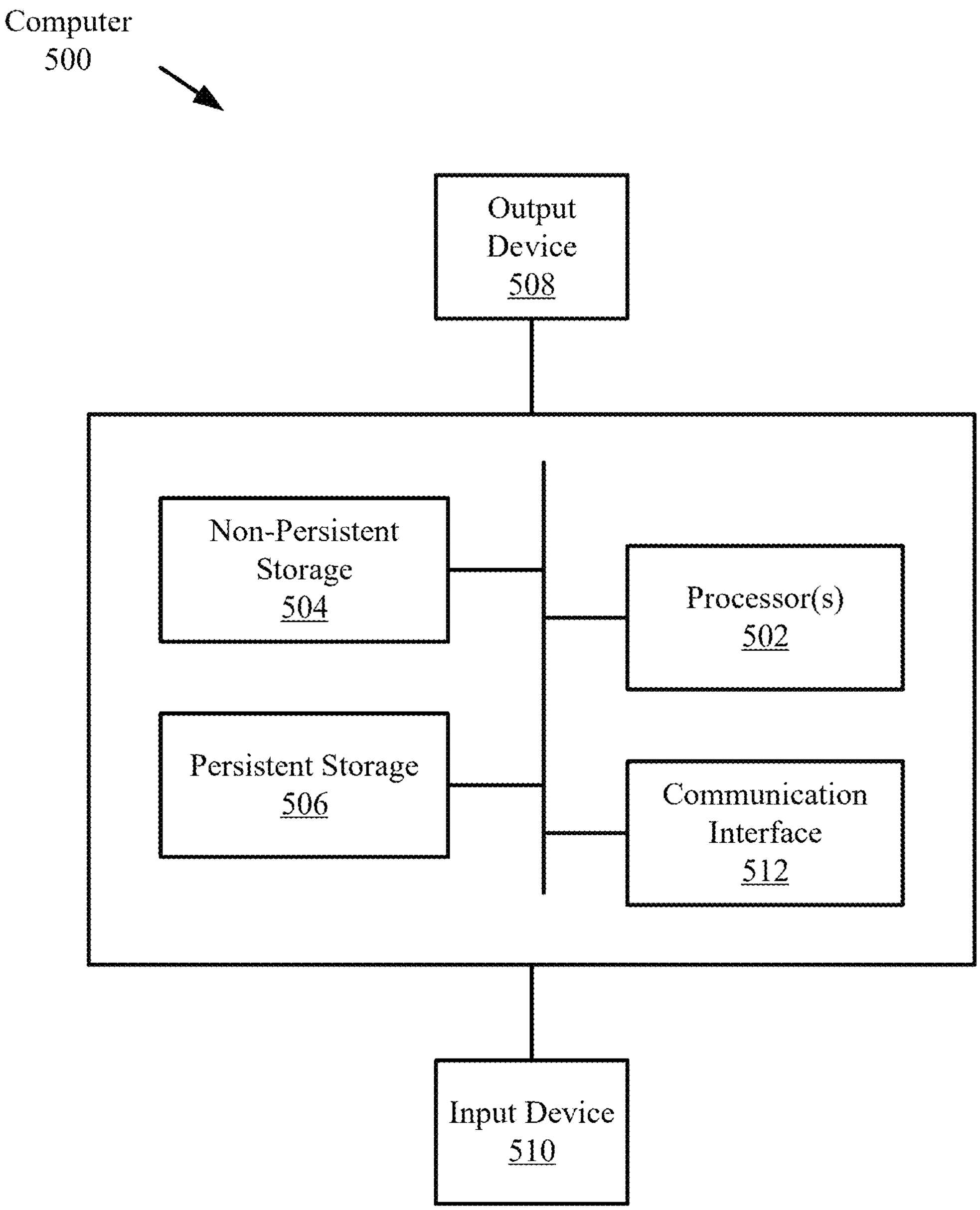
FIG. 5 shows a diagram of a computing device in accordance with one or more embodiments of the invention.

As discussed above, embodiments of the invention may be implemented using computing devices. FIG. 5 shows a diagram of a computing device in accordance with one or more embodiments of the invention. The computing device (500) may include one or more computer processors (502), non-persistent storage (504) (e.g., volatile memory, such as random access memory (RAM), cache memory), persistent storage (506) (e.g., a hard disk, an optical drive such as a compact disk (CD) drive or digital versatile disk (DVD) drive, a flash memory, etc.), a communication interface (512) (e.g., Bluetooth interface, infrared interface, network interface, optical interface, etc.), input devices (510), output devices (508), and numerous other elements (not shown) and functionalities. Each of these components is described below.

In one embodiment of the invention, the computer processor(s) (502) may be an integrated circuit for processing instructions. For example, the computer processor(s) may be one or more cores or micro-cores of a processor. The computing device (500) may also include one or more input devices (510), such as a touchscreen, keyboard, mouse, microphone, touchpad, electronic pen, or any other type of input device. Further, the communication interface (512) may include an integrated circuit for connecting the computer (500) to a network (not shown) (e.g., a local area network (LAN), a wide area network (WAN) such as the Internet, mobile network, or any other type of network) and/or to another device, such as another computing device.

In one embodiment of the invention, the computing device (500) may include one or more output devices (508), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (502), non-persistent storage (504), and persistent storage (506). Many different types of computing devices exist, and the aforementioned input and output device(s) may take other forms.

One or more embodiments of the invention may be implemented using instructions executed by one or more processors of the data management device. Further, such instructions may correspond to computer readable instructions that are stored on one or more non-transitory computer readable mediums.

One or more embodiments of the invention may improve the operation of one or more computing devices. More specifically, embodiments of the invention improve the processing of natural language queries by improving natural language processing to SQL (or other database formats) translations to democratize access to complex datasystems within organizations. Such access may enable non-technical staff to interact with databases more easily. This could lead to new insights and better decision-making at all levels of the organization.

Embodiments of the invention may improve the efficiency of processing user queries to retrieve data from a database. Specifically, embodiments of the invention enable users without knowledge of database query formats to obtain data from such databases. Embodiments of the invention enable grammar-based retrieval system with domain-independent functionalities. Further, embodiments of the invention process intent in user queries that may be uncertain and misinterpretable in nature. For example, user queries with a given intent may be written in many different ways for the same natural language. As such, variability of intent for a given user query may be high. Embodiments of the invention provide automatic interpretation of natural language queries to generate the most accurate and holistic database query and access the desired data. Further, embodiments of the invention may enable generation of nested database queries for complex user queries.

Thus, embodiments of the invention may address the problem of inefficient use of computing resources. This problem arises due to the technological nature of the environment in which file systems are utilized.

The problems discussed above should be understood as being examples of problems solved by embodiments of the invention disclosed herein and the invention should not be limited to solving the same/similar problems. The disclosed invention is broadly applicable to address a range of problems beyond those discussed herein.

While the invention has been described above with respect to a limited number of embodiments, those skilled in the art, having the benefit of this disclosure, will appreciate that other embodiments can be devised which do not depart from the scope of the invention as disclosed herein. Accordingly, the scope of the invention should be limited only by the attached claims.

What is claimed is:

1. A method for servicing user queries, the method comprising:
- obtaining, by a data system and from a client device, a user query for accessing a database;
- in response to the user query:
  - configuring an enhanced context embedding model;
  - applying a vectorized embedding on the user query using the enhanced context embedding model to obtain a vectorized user query;
  - performing a hyperparameter optimization on the vectorized user query using a pre-defined optimization algorithm to obtain an optimal database query,
  - wherein the pre-defined optimization algorithm comprises:
    - initializing a random population of potential solutions of database queries to obtain a population:
    - evaluating a fitness value of each potential solution in the population;
    - selecting, from the population and based on the fitness value of each potential solution in the population, a pair of solutions for offspring generation;
    - applying a crossover technique on the pair of solutions to generate offspring solutions;
    - applying a mutation technique on the offspring solutions to generate new solutions;
    - selecting, from the new solutions, a set of elite solutions; and
    - updating the population using the set of elite solutions to obtain an updated population;
    - issuing the optimal database query to the database to obtain a response, wherein the optimal database query represents an
  - optimal solution in the updated population; and
  - providing the response to the client device.

2. The method of claim 1, further comprising:
- prior to obtaining the user query:
  - obtaining, from a data source, a source document;
  - performing a chunking on the source document based on content of the source document to obtain a set of source chunks;
  - applying a vectorization on each of the set of source chunks to obtain a set of vectorized documents; and
  - storing the set of vectorized documents, wherein the vectorized documents are used for the vectorized embedding.

3. The method of claim 1, wherein the user query is written in a natural language.

4. The method of claim 1, wherein the vectorized embedding is applied using a large language model applied to the user query.

5. The method of claim 1,
- wherein the database is accessible using a database format readable by the database,
- wherein the database query is in the database format, and
- wherein the user query is not in the database format.

6. A non-transitory computer readable medium comprising computer readable program code, which when executed by a computer processor enables the computer processor to perform a method for servicing user queries, the method comprising:
- obtaining, by a data system and from a client device, a user query for accessing a database;
- in response to the user query:
  - configuring an enhanced context embedding model;
  - applying a vectorized embedding on the user query using the enhanced context embedding model to obtain a vectorized user query;
  - performing a hyperparameter optimization on the vectorized user query using a pre-defined optimization algorithm to obtain an optimal database query,
  - wherein the pre-defined optimization algorithm comprises:
    - initializing a population of potential solutions of database queries, wherein each potential solution in the population represents a velocity and position:
    - evaluating a fitness value of each potential solution in the population;
    - for each potential solution in the population: evaluating a corresponding database query to obtain a particle score of each database solution, and updating a particle personal best position and a global best position based on the particle score; and updating a velocity and position of each potential solution based on the global best position and each corresponding particle personal best position to obtain a new velocity and position of each potential solution in the population;

issuing the optimal database query to the database to obtain a response; and providing the response to the client device.

7. The non-transitory computer readable medium of claim 6, further comprising:

prior to obtaining the user query:

obtaining, from a data source, a source document;

performing a chunking on the source document based on content of the source document to obtain a set of source chunks;

applying a vectorization on each of the set of source chunks to obtain a set of vectorized documents; and storing the set of vectorized documents, wherein the vectorized documents are used for the vectorized embedding.

8. The non-transitory computer readable medium of claim 6, wherein the user query is written in a natural language.

9. The non-transitory computer readable medium of claim 6, wherein the vectorized embedding is applied using a large language model applied to the user query.

10. The non-transitory computer readable medium of claim 6, wherein the database is accessible using a database format readable by the database, wherein the database query is in the database format, and wherein the user query is not in the database format.

11. A system, comprising:

a data system operating on a processor; and memory comprising instructions, which when executed by the processor, perform a method comprising:

obtaining, from a client device, a user query for accessing a database, wherein the user query is written in a natural language;

in response to the user query:

configuring an enhanced context embedding model;

applying a vectorized embedding on the user query using the enhanced context embedding model to obtain a vectorized user query;

performing a hyperparameter optimization on the vectorized user query using a pre-defined optimization algorithm to obtain an optimal database query, wherein the pre-defined optimization algorithm comprises:

initializing a population of potential solutions of database queries, wherein each potential solution in the population represents a velocity and position:

evaluating a fitness value of each potential solution in the population:

for each potential solution in the population: evaluating a corresponding database query to obtain a particle score of each database solution, and updating a particle personal best position and a global best position based on the particle score; and updating a velocity and position of each potential solution based on the global best position and each corresponding particle personal best position to obtain a new velocity and position of each potential solution in the population;

issuing the optimal database query to the database to obtain a response; and providing the response to the client device.

12. The system of claim 11, further comprising:

prior to obtaining the user query:

obtaining, from a data source, a source document;

performing a chunking on the source document based on content of the source document to obtain a set of source chunks;

applying a vectorization on each of the set of source chunks to obtain a set of vectorized documents; and storing the set of vectorized documents, wherein the vectorized documents are used for the vectorized embedding.

13. The system of claim 11, wherein the vectorized embedding is applied using a large language model applied to the user query.

14. The system of claim 11, wherein the database is accessible using a database format readable by the database, wherein the database query is in the database format, and wherein the user query is not in the database format.

* * * * *